July 22, 1958 G. J. WEBSTER ET AL 2,844,445
PROCESS AND APPARATUS FOR PELLETING CARBON BLACK
Filed Nov. 12, 1954
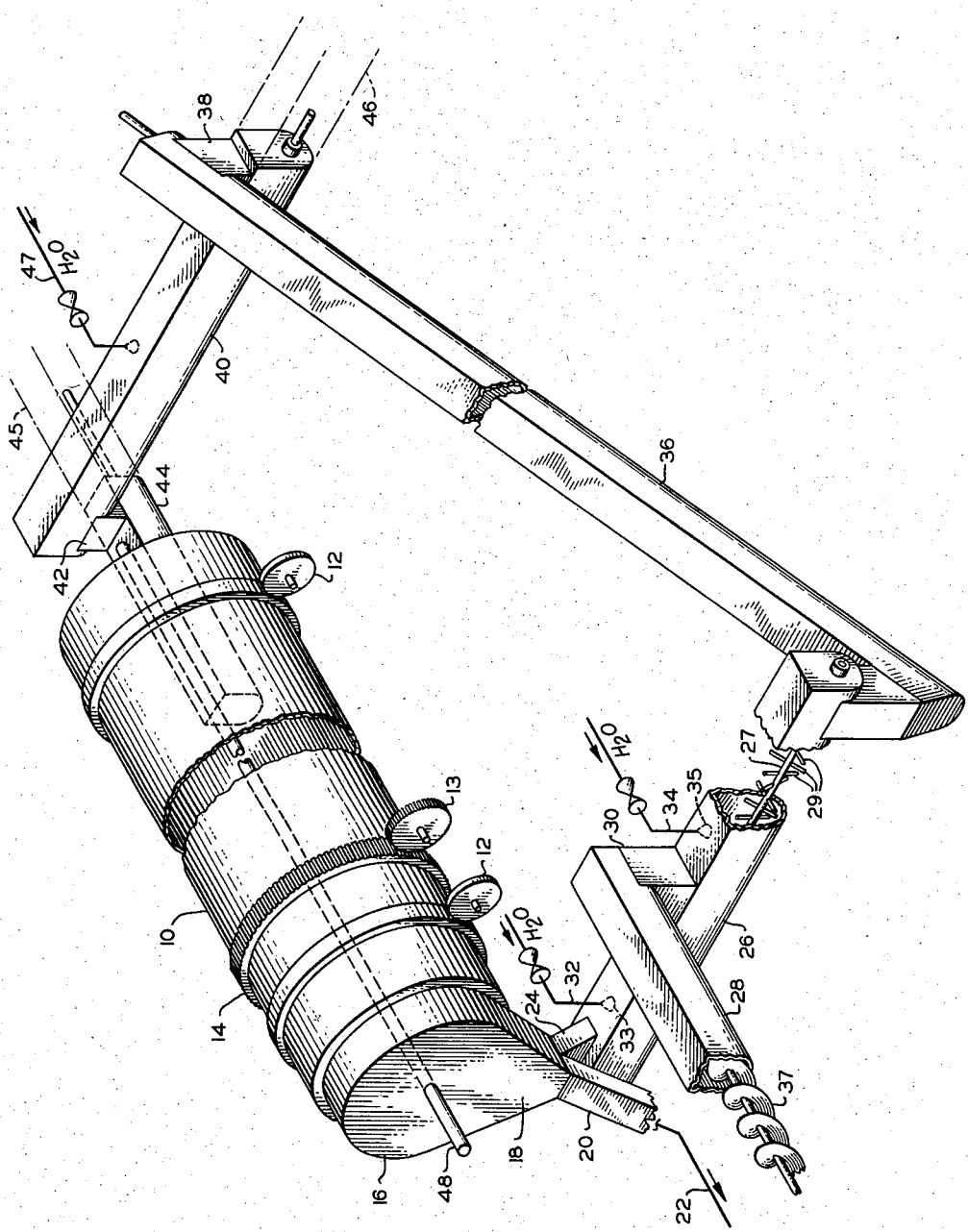
INVENTOR.
G. J. WEBSTER
W. H. RUSHFORD
BY
ATTORNEYS

United States Patent Office 2,844,445
Patented July 22, 1958

2,844,445

PROCESS AND APPARATUS FOR PELLETING CARBON BLACK

George J. Webster and Wilson H. Rushford, Borger, Tex., assignors to Phillips Petroleum Company, a corporation of Delaware Application November 12, 1954, Serial No. 468,369

11 Claims. (Cl. 23—314)

This invention relates to an improved process and apparatus for pelleting carbon black. A specific aspect of the invention pertains to a process and apparatus for introducing water to carbon black in the pelleting thereof.

In the manufacture of carbon black by various methods it is common practice to pass the hot carbon black from the manufacturing process directly to a pellet mill which pellets the loose black by rolling the same in a similar manner to that utilized in a tumbling drum. In rolling the particles of loose black in contact with each other nuclei are formed and these gather additional particles of the black until small, generally spherical pellets have been formed. The loose black is conventionally introduced to a horizontally rotating cylindrical pelleting mill at one end thereof and as the material is formed into pellets the same progress thru the mill to the outlet in the delivery end of the mill. The effluent pellets are usually divided into a product stream and a recycle stream, the product pellets being transferred to storage or packaging by suitable conveyor equipment and the recycle pellets being conveyed to and reintroduced to the feed end of the mill. Considerable loose black or dust is recycled with the oversize and/or undersize pellets.

In a recently developed process fully disclosed in the copending application of Oliver K. Austin, Serial No. 386,585, filed October 16, 1953, water is sprayed onto the pellet bed in the mill in order to reduce the temperature of the effluent pellets to a level which is not deleterious to the conveyor belts which are utilized to transfer the effluent pellets either to storage or to recycle. In the process disclosed sufficient water is sprayed onto the pellet bed to reduce the temperature of the effluent pellets to below about 225° F. and sufficient of the water is evaporated in the mill to produce pellets of less than 1 weight percent water content.

In the conventional pelleting of carbon black considerable dust (loose black) is present in the air around the mills and conveyors. Much of this dust gets into the atmosphere around the mills from the effluent pellet stream from the mills. Of course, this is a waste of carbon black product and is not conducive to good working conditions around the plant. Any process which decreases the amount of dust in the effluent pellet stream from a mill is highly desirable. In the usual pelleting process a loose black is fed into the mill by means of one or more screw conveyors and frequently the loose black pressurizes in the feed screw and at times blows completely thru the mill. This, of course, increases the concentration of dust in the surrounding atmosphere and contributes to the inefficiency of production.

The principal object of the invention is to provide an improved process and apparatus for pelleting carbon black. Another object is to provide a process and apparatus for pelleting carbon black which increases the production rate in any given plant producing pellets of a constant density or increases the density of the product pellets at a fixed production rate. Another object of the invention is to provide a process and apparatus for pelleting carbon black which reduces the dust around the plant. A further object is to provide a process and apparatus which reduces dust or fines in the product pellets of a carbon black pelleting mill. It is also an object of the invention to reduce the fire hazard in a carbon black plant. Other objects of the invention will become apparent from a consideration of the accompanying disclosure.

We have found that by spraying water onto the pellet recycle stream from a pellet mill in an amount sufficient to wet the pellets without forming carbon black mud in the conveyor the pelleting process is improved by the reduction of loose black in the effluent pellet stream from the mill and either a more dense pellet can be produced at standard production rates or the production rate can be increased when producing pellets of standard density. In addition, the carbon black is sufficiently moist or wet during the process, including the recycle, to practically eliminate fire hazard. The process comprises transferring the recycle pellet stream from the foot of the mill generally horizontally in a pin-type conveyor to an elevator conveyor which delivers the recycle stream to a second generally horizontal conveyor for delivery to the front end of the mill thru a conveyor which projects a short distance into the mill. A primary water spray is introduced to the recycle stream in the pin conveyor shortly after the stream enters the conveyor. Downstream of the aforementioned water spray the loose black feed to the mill is introduced to the pin conveyor and mixed with the moist recycle pellets therein. Downstream of the introduction point of the loose black a secondary water spray is introduced to the mixture of loose black and recycle pellets after which further mixing takes place and the moist or wet mixture of pellets and loose black is transferred by elevator and conveyor to the feed end of the mill as the feed thereto.

A more complete understanding of the invention may be had from a consideration of the drawing which shows schematically one arrangement of apparatus in accordance with the invention.

Referring to the drawings, a conventional horizontally rotating mill 10 is supported on wheels or other support means 12 which permit rotation of the mill by means of a drive gear 13 engaging ring gear 14. A hood 16 covers the delivery end of the mill and encloses conventional pellet separation means (not shown) in combination with housing 18. A chute 20 receives product pellets and passes the same by means of conveyor line 22 to packaging, shipping facilities, or storage. A second chute 24 passes pellets from the separation means to a recycle conveyor 26 which is preferably a pin-type conveyor. A suitable conveyor such as an auger or screw-type conveyor 28 feeds loose carbon black into conveyor 26 thru chute 30. A primary water line 32 and a secondary water line 34 are connected with spray heads 33 and 35 inside conveyor 26 adapted for delivering a fine spray of water to the carbon black in the conveyor upstream and downstream, respectively, of conveyor 28 or the point of introduction of loose black to recycle conveyor 26.

Conveyor or elevator 36 transfers the moist mixed recycle pellets and loose black feed from the downstream end of conveyor 26 to a chute 38 leading to conveyor 40 which delivers the feed to a chute 42 leading into one or more feed conveyors 44. Conveyor 44 delivers the carbon black feed to one or more points inside mill 10. Where desired a portion or all of the loose carbon black feed may be introduced to the system thru line 45 or line 46 although it is preferred to introduce at least a portion of the loose feed, such as 10 weight percent, thru conveyor 28. Water line 47 may be used to introduce all or part of the water to the recycle stream.

A support pipe 48 extends axially thru the mill and is supported at each end outside of the mill by support columns not shown. Support pipe 48 is utilized to support scraper means within the mill, not shown, and also feed conveyor 44.

In operation, recycle pellets entering conveyor 26 from chute 24 are transferred toward elevator 36 and are sprayed with water from primary water line 32 and sprayer 33. The primary water spray should be introduced to the recycle pellets as soon as feasible after they enter conveyor 26 so that the water will have an opportunity to penetrate the pellets uniformly by the time they arrive at chute 30 from which loose carbon black is delivered into the recycle stream. A great deal of the loose black then adheres to the moist pellets and, as they pass downstream, secondary water is sprayed onto the dust-coated pellets so as to effect additional build up of the pellets with loose black and add sufficient water to the recycle stream to effect a desired temperature control and facilitate the pelleting which takes place in mill 10. The maximum amount of water than can safely be added to the pellets and loose black in conveyor 26 without forming a carbon black mud therein is about 25 pounds of water per 100 pounds of carbon black and it is advantageous to spray at least 2 pounds of water per 100 pounds of black. It is desirable to introduce at least 10 percent of the water sprayed into conveyor 26 as secondary water thru line 34. In any event, sufficient water should be added to the recycle stream and mixed feed in conveyor 26 to reduce the temperature of the pellets egressing thru line 22 to substantially below about 250° F., and preferably below 225° F., so as to avoid deteriorating the conveyor belt in conveyor 22.

Addition of water to the recycle stream in conveyor 26 is advantageous and it is preferred to operate in this manner. However a part or all of the water may be introduced to the recycle at any point downstream providing adequate mixing of pellets, loose black, and water is effected. It is feasible to spray a portion such as at least 10 weight percent of the water to the pellets in conveyor 26 and add the remainder at any point downstream, such as in conveyor 40 thru line 47. In this case it is desirable to add at least a portion of the loose black feed, such as 10 percent, to conveyor 40 thru conveyor line 46. In any case mixing of the recycle pellets, loose black, and water is essential prior to introduction of the recycle to the mill and it is advantageous to introduce at least a portion of the water and at least a portion of the loose black feed to the recycle stream in conveyor-mixer 26.

It is highly desirable to utilize a pin-type conveyor as conveyor 26 because of the advantage obtained by mixing of the moist pellets and loose black which is effected by this type of conveyor during movement of the material to elevator 36. A pin-type conveyor must be selected which effectively mixes the moist pellets and loose black and simultaneously moves them along at a desired rate. The pin conveyor must be operated at a rate below that at which a substantial amount of destruction of recycle pellets occurs yet fast enough so that the transfer rate is sufficient to maintain the proper thru-put for maximum production. Selection of a pin-type conveyor of suitable size and design for the design of the mill is within the skill of the art.

The apparatus and process of the invention effect greater production with a mill of given size, or pellets of greater density at normal production rates because of more uniform mixing of pellets, loose black, and water. In addition, the dust problem around the mill is substantially alleviated. Also, the product quality is improved by reducing the fines or dust content of the product pellet stream.

Certain modifications of the invention will become apparent to those skilled in the art and the illustrative details disclosed are not to be construed as imposing unnecessary limitations on the invention.

We claim:

1. Apparatus comprising a rotatable pellet mill having a rotatable cylindrical shell wherein powdered material is pelleted by tumbling and cascading from the inner surface of said shell, a feed inlet line at one end and a pellet outlet at the opposite end; means connected with said pellet outlet for separating effluent pellets into a product stream and a recycle stream; a recycle conveyor-mixer connected with said means so as to receive recycle pellets; a feed conveyor connected with an intermediate section of said conveyor-mixer for feeding powdered pelletable material thereto; separate conveyor means connected with the downstream end of said conveyor-mixer and leading to said feed inlet line; spraying means in said conveyor-mixer upstream of said feed conveyor; and spraying means in said conveyor-mixer intermediate said feed conveyor and said conveyor means.

2. The apparatus of claim 1 wherein said mill is horizontally elongated and said conveyor-mixer is a pin-type conveyor.

3. Apparatus comprising a rotatable pellet mill having a rotatable cylindrical shell wherein powdered material is pelleted by tumbling and cascading from the inner surface of said shell, a feed inlet line at one end and a pellet outlet at the opposite end; means connected with said pellet outlet for separating effluent pellets into a product stream and a recycle stream; a recycle conveyor system connected with aforesaid means so as to receive recycle pellets therefrom and with said feed inlet line, said conveyor system having a mechanical mixer therein for mixing pellets, loose black and water, whereby pelleting is initiated in said mixer; at least one sprayer means in said recycle conveyor system upstream of the downstream end of said mixer; and a feed conveyor connected with said recycle conveyor system.

4. The apparatus of claim 3 wherein said mixer comprises a pin-type conveyor.

5. The apparatus of claim 4 wherein said pin-type conveyor is close to said means for separating effluent pellets, and said feed conveyor connects with an intermediate section of said pin-type conveyor.

6. A process for pelleting hot carbon black comprising passing a feed as hereinafter described to a rotating pellet mill so as to form pellets therein by tumbling and cascading said black from the inner surface of the rotating shell of said mill; withdrawing a stream of pellets from said mill and dividing same into a product stream and a recycle stream; spraying water onto the pellets in said recycle stream in an amount in the range of 2 to 24 pounds per 100 pounds of carbon black which wets said black without forming a mud thereof; admixing with said recycle stream a stream of loose flocculent carbon black so as to prepare a moist feed for said mill; mechanically agitating and mixing said feed for a substantial period whereby pelleting thereof is initiated; and thereafter passing said moist feed to said mill.

7. The process of claim 6 wherein a portion of said water is sprayed onto said recycle stream before admixing said stream of loose flocculent carbon black therewith and another portion thereof is sprayed onto the admixture.

8. A process for pelleting hot carbon black so as to produce pellets having a temperature below about 225° F. comprising passing a feed stream of carbon black as hereinafter described to one end of a horizontally elongated rotating pellet mill and forming pellets therein by tumbling and cascading said black from the inner surface of the rotating shell of said mill; withdrawing a stream of pellets from the other end of said mill and dividing same into a recycle stream and a product stream; spraying water onto said recycle stream so as to moisten the pellets therein without forming a mud thereof; passing a stream of flocculent carbon black at a temperature above about 250° F. into said recycle stream and forming an intimate mixture of the two streams; mechanically agitating and mixing said feed for a substantial period whereby pelleting thereof is initiated; thereafter passing said mixture to said mill as said feed; and controlling the amount of water added so as to reduce the temperature of the effluent pellets to below 225° F.

9. The process of claim 8 wherein the amount of water is in the range of 2 to 24 pounds per 100 pounds of carbon black and the water content of the product pellets is less than about 1 percent by weight.

10. The process of claim 8 wherein a portion of said water is sprayed onto said recycle stream after admixture of same with said flocculent black.

11. The process of claim 10 wherein said portion is at least 10 weight percent of the total water sprayed onto said carbon black.

References Cited in the file of this patent

UNITED STATES PATENTS

| | | |
|---|---|---|
| 1,931,499 | Klugh | Oct. 24, 1933 |
| 2,136,793 | Gabeler et al. | Nov. 15, 1938 |
| 2,457,962 | Whaley | Jan. 4, 1949 |
| 2,500,968 | Venuto | Mar. 21, 1950 |
| 2,502,106 | Skoog et al. | Mar. 28, 1950 |
| 2,550,802 | Gholson | May 1, 1951 |
| 2,642,343 | Studebaker | June 16, 1953 |
| 2,695,837 | Benz | Nov. 30, 1954 |
| 2,699,381 | King | Jan. 11, 1955 |